Patented Oct. 5, 1943

2,331,276

UNITED STATES PATENT OFFICE 2,331,276

ORGANIC THIOCYANATES AND ISOTHIO-CYANATES AND PROCESS OF PREPARING THE SAME

Josef Pikl, Pitman, N. J., assignor to E. I. du Pont de Nemours & Company, Wilmington, Del., a corporation of Delaware No Drawing. Application October 30, 1940, Serial No. 363,524

12 Claims. (Cl. 260—402.5)

This invention relates to novel organic compounds and to a process for preparing the same. More particularly this invention deals with novel thiocyanates and isothiocyanates obtainable by condensing a salt of thiocyanic acid with halogeno-methylamides having long-chain alkyl radicals in their structure.

It is an object of this invention to prepare novel organic compounds which are useful in the art of treating textile fiber, especially for the purpose of endowing the same with water-repellency or with softness of feel. Further important objects of this invention will appear as the description proceeds.

The novel compounds of this invention are characterized by a structure corresponding to the following general formula

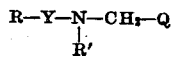

wherein R is an aliphatic or alicyclic radical (in other words, a non-aromatic radical) containing at least 7 carbon atoms and being free from water-solubilizing groups. Y is a link selected from the group consisting of CO, O—CO, NH—CO, CO—NHCO and O—CO—NHCO; R' stands for hydrogen, a lower alkyl group, or a lower alkylene group which is attached to the nitrogen atom of another radical of the form

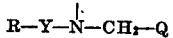

(R, Y and Q having the same significance as above); and finally, Q stands for a radical of the group consisting of the thiocyanate radical —S—CN and the isothiocyanate radical —N—CS.

As typical illustrations of compounds falling within the above general class may be mentioned at this point:

Stearamido-methyl-thiocyanate:

N-methyl-stearamido-methyl-thiocyanate:

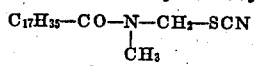

and

Methylene-bis(stearamido-methyl-thiocyanate):

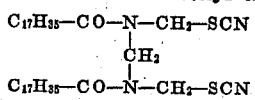

My invention, however, is not limited to these compounds, since it embraces compounds wherein the group $C_{17}H_{35}$ above is replaced by various other alkyl groups, or by alkyloxy, alkylamino, or acyl imino groups, having an alkyl chain of from 9 to 36 carbon atoms, while the thiocyanate radical —SCN, may be replaced by the isothiocyanate radical, —NCS.

These compounds are prepared, according to this invention, by reacting with a salt of thiocyanic acid, for instance an alkali-metal thiocyanate or a heavy metal thiocyanate, upon an amido compound of the general formula

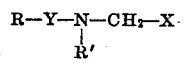

wherein R, Y and R' have the same significance as above, while X stands for halogen, preferably chlorine or bromine.

At first a thiocyanate is formed, which however in most cases rearranges gradually to give the isothiocyanate. Taking stearamido-methylchloride and potassium thiocyanate as convenient individuals for the purpose of illustration, the reactions may be expressed by the following equations:

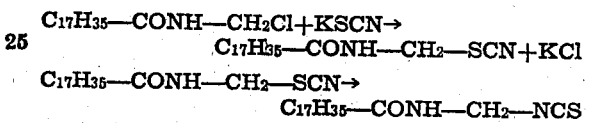

At room temperature, the rearrangement is very slow and may take several weeks for complete isomerization. But by heating to convenient temperatures, say up to 100° C., the process may be completed within a few hours.

The ease with which the chloromethyl compounds react with the salts of thiocyanic acid depends greatly upon the content of moisture of the reaction mass. If the metal thiocyanate contains a small amount of moisture, that is from 2 to 5% by weight, the reaction proceeds readily at room temperature and is finished in several hours. If the reaction medium is perfectly dry no noticeable reaction takes place at room temperature, but a higher temperature such as 60 to 100° C. is necessary to bring the reaction about. The reaction is usually carried out in an inert medium such as benzene, carbon tetrachloride, cyclohexane, trichloroethylene or ethyl acetate, but it may also be carried out in the absence of a solvent by simply heating the chloromethyl amide with a salt of thiocyanic acid and then separating the inorganic salts from the reaction mass by a suitable solvent or by filtration at a temperature above the melting point of the reaction product.

This reaction may also be carried out under vacuum if the reaction products are not volatile.

The amount of the salt of thiocyanic acid necessary to carry the reaction to completion may be one mol equivalent per mol of the chloromethyl derivative or in excess thereof, as there is no difficulty involved in separating the organic thiocyanate from the inorganic salts. A large excess of inorganic thiocyanate may be used.

In the reaction between the organic methylene chloride and the inorganic thiocyanate, any residual acidity left in the product or occluded therein may be eliminated by carrying out the reaction in the presence of a small amount of a basic reagent like sodium carbonate, barium carbonate, magnesium oxide or pyridine. The addition of these products tends also to decrease the formation of by-products. When the reaction is complete, it is desirable to neutralize any free acids which may remain in the reaction product by stirring the product with a slightly moist basic material like potassium carbonate, calcium oxide or magnesium oxide. In this way a product can be obtained which is neutral to Congo red paper. The last traces of moisture may be removed by treatment with some drying agents like $CaCl_2$, sodium sulfate, or alumina.

The initial methylene halide compounds employed in my invention may be selected from among any of the compounds described and claimed in U. S. Patent No. 2,131,362, or in British Patents Nos. 492,699, 494,761 and 501,480, and may be prepared by the methods therein set forth. Generally speaking, these compounds are prepared by reacting with formaldehyde and hydrogen chloride on an amide compound of the general formula R—Y—NH—R', wherein R, Y and R' have the same significance as above, it being noted that Y always contains a CO group next to the NH, thus placing the compound in the classification of amides. As typical illustrations of such amide initial material, without however any intent to limit this invention, may be mentioned:

Stearamide:
$$C_{17}H_{35}—CONH_2$$

Octadecyl-carbamate:
$$C_{18}H_{37}—O—CONH_2$$

Octadecyl-urea:
$$C_{18}H_{37}—NH—CO—NH_2$$

Stearyl-urea:
$$C_{17}H_{35}—CONH—CONH_2$$

Octadecyl-allophanate:
$$C_{18}H_{37}—O—CONH—CONH_2$$

Methyl-stearamide:
$$C_{17}H_{35}—CONH—CH_3$$

Distearamido-methane:
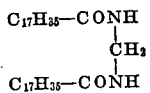

Montanic acid amide:
$$C_{27}H_{55}—CONH_2$$

2-hexadecyl-eicosanoic acid amide:
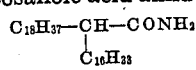

Tridecamethylene-diamide:
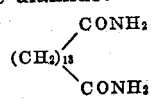

and similar compounds derived from other higher fatty acids or alcohols, whether saturated or unsaturated, straight-chain or alicyclic, (for instance naphthenic and hydroabietic), and which are generally derived from the constituents of natural oils, fats and waxes.

The chloromethylene derivatives of these amides are usually low melting solids which are very soluble in solvents like benzene or carbon tetrachloride. They may be prepared as described in the above mentioned patents by reacting the amide with gaseous hydrogen chloride and paraformaldehyde, or by using an aqueous formaldehyde solution and hydrogen chloride gas, or even by using aqueous formaldehyde and aqueous hydrochloric acid. In this latter case it is, however, advisable to use some calcium chloride or another water removing agent together with the formaldehyde and hydrochloric acid. The chloromethylene compounds may also be prepared by the action of hydrogen chloride on the corresponding methylol amides.

After the preparation of the chloromethyl compound, the excess of hydrogen chloride is removed either by evaporating the solvent in vacuo or by blowing an inert gas like $CO_2$ or $N_2$ through the solution until all or most of the HCl is removed.

In view of the slow process of isomerization, the products of this invention are generally probably mixtures of thiocyanates and isothiocyanates, whose exact composition varies with the age of the product, and whose properties are a composite result of the properties of the individual components and their relative proportions at any given time.

The pure thiocyanates, which may be approximated by the products of this invention as freshly prepared, are generally oils or low-melting waxes, soluble in benzene and other common organic solvents. They react readily with tertiary bases to give crystallizable, water-soluble compounds, presumably quaternary ammonium compounds, thus:

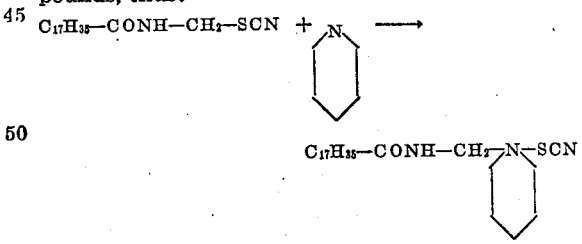

The quaternary compounds are stable both in substance and in aqueous solution, and no longer isomerize into isothiocyanates. They are also soluble in organic solvents, and concentrations thereof up to 50% by weight may be readily prepared. When cotton fabric is treated with an aqueous solution (0.2 to 2%) of these quaternary compounds and then dried and baked in the absence of moisture at a temperature between 100 and 170° C., it acquires a soft feel and a high degree of water-repellency, both of which properties are permanent to laundering and dry-cleaning. Smaller concentrations, say 0.01 to 0.2% are sufficient to impart softness to fabric under the same treatment.

Similar effects upon fabric may be obtained by similar treatments using the thiocyanates themselves from organic solution, for instance benzene, trichlorethylene or carbon tetrachloride.

The pure isothiocyanates, which may be approximated by the products of this invention after standing for several months, are likewise oils or low melting waxes. They do not, however, react with tertiary bases to give water-soluble compounds, and this test may be used to estimate at any given time the percentage conversion or isomerization of a given sample. Like the thiocyanates, the iso-compounds are soluble in benzene, trichlorethylene, carbon tetrachloride, and similar common organic solvents, and when applied from such solutions to textile fiber, they produce effects similar to those above described.

Without limiting my invention to any particular procedure, the following examples are given to illustrate my preferred mode of operation. Parts mentioned are by weight.

*Example 1*

275 parts of methylene distearamide was mixed thoroughly with 60 parts of paraformaldehyde and then gradually added to 500 parts of benzene which has been heated to 60° C., while passing into this reaction mixture a constant stream of hydrogen chloride. After a clear solution resulted the reaction was continued for a few hours longer than the aqueous layer drawn off and the benzene evaporated under vacuum on the steam bath.

62 parts of this residue were dissolved in 100 parts of benzene, and then 60 parts of slightly moist potassium thiocyanate were added and the mass was agitated at room temperature for two days.

The inorganic salts were filtered off and the clear solution was evaporated in vacuo. 50 parts of a somewhat yellow oil were obtained, which solidified to a rather brittle, low melting wax.

The product contained 9.12% of sulfur and only 0.1% of chlorine.

The calculated amount of sulfur for methylene di-(stearamidomethyl thiocyanate), $C_{41}H_{76}O_2N_4S_2$, is 8.9%. The probable formula of this product is:

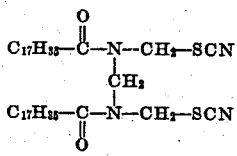

When cotton cloth was impregnated with a 1% solution of this product in carbon tetrachloride and then heated to 150° C. for three minutes, the material was strongly water-repellent and lost only very little of this property by washing the fabric with soap and hot water or by dry cleaning the fabric with organic solvents.

*Example 2*

74 parts of methylene-di-(stearamidomethyl chloride) prepared as in Example 1 were dissolved in 80 parts of benzene and agitated with 6 parts of barium carbonate for half an hour.

40 parts of finely pulverized potassium thiocyanate was mixed with 1 part of water and then added to the above benzene solution.

After agitating the reaction mass for 16 hours it was almost neutral to Congo red paper. More benzene was added and the liquid was then filtered off from the inorganic salts. Upon evaporation of the solvent, a slightly yellow wax remained which analyzed as follows:

Nitrogen 7.28%  Calculated for $C_{41}H_{76}O_2N_4S_2$: $N=7.8$
Sulfur 7.76%   $S=8.9$ When applied to cotton and rayon taffeta from a 1% solution in benzene and then subjected to a baking step, the fabrics became strongly water-repellent, which property was fast to washing.

*Example 3*

220 parts of methylene distearamide was converted into the corresponding di-chloromethyl compound by suspending the amide in 800 parts of benzene and then adding, in the course of one and one-half hours, 36 parts of paraformaldehyde, while passing in a stream of gaseous hydrogen chloride, as described in Example 1. The residue which was obtained upon evaporation was diluted with 50 parts of benzene and added to a suspension of 250 parts of lead thiocyanate in 250 parts of boiling benzene. The lead salt had been previously thoroughly dried by distilling it with benzene. The reaction mixture was kept at the boil for twenty minutes and then cooled to room temperature, decolorized with charcoal and filtered from the inorganic salts and the charcoal. The solution thus obtained was still slightly acid to Congo red paper and was neutralized by agitating the solution with some powdered potassium carbonate, calcium oxide or any other basic compound capable of neutralizing the solution. When a cotton or rayon fabric was impregnated with an 0.5% solution of this product in carbon tetrachloride, then subjected to a baking step at 150° C., after treated with some hot water and ironed, the fabric was strongly water-repellent and did not lose this property upon washing or dry-cleaning.

*Example 4*

252 parts of octadecyl carbamate were dissolved in 1600 parts of benzene heated to 60° C., and a stream of hydrogen chloride was passed in. To this solution there was added, in the course of 1½ hours, 72 parts of paraformaldehyde. When all the formaldehyde has been added, the reaction was continued for one hour longer, then the aqueous layer was drawn off, and the benzene solution was evaporated in vacuo on the steam bath. The residue was dissolved in 100 parts of benzene and added to 160 parts of dry lead thiocyanate suspended in 300 parts of hot benzene. The reaction mass was kept vigorously boiling for twenty minutes then filtered while still warm and then allowed to cool to room temperature and treated with 50 parts of potassium carbonate for 16 hours. Finally the solution was treated with 50 parts of calcium chloride for 5 hours and then filtered from the inorganic salts. The orange colored residue contained 8.96% sulfur.

When cotton or rayon fabrics were treated with a dilute solution of this product as in Example 3, a permanently water-repellent fabric was obtained which had a soft feel.

*Example 5*

Methyl stearamide was converted in known manner to the chloromethylamide and then reacted with lead thiocyanate. This chloride appeared to be somewhat less reactive than those above, and the reaction mixture had to be heated to 80° C. for several hours to complete the reaction. The resulting thiocyanate imparted permanent water-repellency to cotton, when this was impregnated with a 1% solution in trichloroethylene and then heated for several minutes to 150° C.

*Example 6*

90 parts of stearamide were dissolved in 500 parts of benzene and then, gradually, 26 parts of paraformaldehyde were introduced, while passing a slow stream of hydrogen chloride through the reaction mass at 60° C. After a few hours, a clear solution resulted; the water was separated and the benzene was evaporated.

To 100 parts of the oily residue obtained there were added 66 parts of dry lead thiocyanate and 200 parts of benzene, and then heated to the boil for thirty minutes replacing the benzene which distills over with fresh, dry benzene. The slightly acid solution was filtered, and neutralized by stirring for 2 hours with 5 parts of potassium carbonate and finally dried with calcium chloride and filtered again. A very faintly yellowish solution was obtained.

When this product was applied from a very dilute solution (0.2%) to cotton or rayon then subjected to a baking treatment for 20 minutes at 150° C. a strongly water-repellent fiber was obtained.

In place of stearamide an equivalent amount of palmitic acid amide, montanic acid amide, octadecyl urea or stearoyl urea may be used.

*Example 7*

A 30% solution in benzene of the product prepared according to Example 4 was mixed with half of its volume of pyridine and then allowed to stand at room temperature for three days. By this time a considerable amount of a crystalline product separated from the solution. It was filtered off and gave in warm water a very viscous clear solution.

This product is the quaternary pyridinium thiocyanate. The benzene solution obtained from the above filtration was evaporated in vacuo and also dissolved to a clear solution in water. When cotton cloth was impregnated with a 1% aqueous solution of this pyridine compound and heated for a few minutes to 120 to 150° C. a strongly water-repellent material was obtained which was not noticeably impaired by a washing process.

If in the above reaction pyridine was replaced by trimethylamine a similar reaction occurred. The resulting product had similar properties to the pyridinium compound. It gave clear, viscous solutions in water, decomposed with alkalies, and rendered fibrous material water-repellent.

*Example 8*

To 50 parts of a 38% solution in benzene of the product secured according to Example 6, 25 parts of pyridine were added, and the mixture was allowed to stand over night. After evaporation of the benzene, the product was clearly soluble in water, giving viscous foaming solution. With the aid of some methyl alcohol the amorphorous product started to crystallize.

Cotton jean cloth was impregnated with a 1% aqueous solution of this product, and dried in the air, then heated for a few minutes to 120 to 150° C. A strongly water-repellent cloth was obtained without impairing the tensile strength noticeably.

When in the above experiment pyridine was replaced by trimethylamine, a similar reaction occurred, yielding a product which was soluble in water and had the property of imparting permanent water-repellency to fibrous materials when heated to a high temperature.

*Example 9*

280 parts of stearic acid were converted into the acid chloride with phosphorus trichloride. The crude reaction product, which was freed from excess acids by placing the material under vacuum and warming the charge, was dissolved in benzene and then, over a period of one hour, 43 parts of hexamethylene-tetramine were added while the charge was heated to 80° C. To the almost clear solution which resulted there were added 228 parts of lead thiocyanate, and the mass was then again heated to the boil for twenty minutes, whereupon the inorganic salts were filtered out. The resulting slightly yellowish solution was neutralized with 30 parts of potassium carbonate and again filtered. Upon evaporation, a low melting hard solid remained which contained essentially one sulfur atom and two nitrogen atoms per long fatty chain.

Cotton and rayon pieces were impregnated with a solution of this product in carbon tetrachloride containing 1% of the active ingredient and then heated for a few minutes to 140° C. The material became strongly water-repellent. This repellency was noticeably increased when the goods were wetted out in hot water and ironed.

A similar result was obtained by using thionyl chloride in the initial stages of the process in lieu of phosphorus trichloride, but the ultimate product was darker. Both products, when treated with pyridine, gave a water-soluble quaternary compound.

Instead of lead thiocyanate in the above examples, calcium thiocyanate, sodium thiocyanate or any other commonly available inorganic salt of thiocyanic acid may be employed.

It will be understood that the details of the above examples may be varied further within wide limits without departing from the spirit of this invention.

It will be understood that the theory advanced hereinabove concerning the isomerization of the thiocyanates is hypothetical and shall not be taken as a limitation upon the scope of this invention. This theory is based on the observation that a benzene solution of stearamido-methylene-thiocyanate or of octadecyl-carbamido-methylene-thiocyanate will readily react with pyridine when only a day or two old, to give completely water-soluble compounds with properties which justify the conclusion that that they are quaternary ammonium compounds. Upon standing, however, these solutions lose partially or completely the power of reacting with pyridine. According to my theory, this loss of reactivity toward pyridine is due to rearrangement into the corresponding isothiocyanates. But exhaustive research data are not available, and it would be difficult to determine the correctness of the above theory absolutely, at this time.

Fortunately, however, such theory is not essential to the practical utility of this invention. I have found that the product is soluble in organic solvents, for instance benzene or carbon tetrachloride, at any stage, and that such solution is capable of endowing textile fabric, especially cellulose, with water-repellent qualities to a very high degree. Evidently, the thio-compounds and the isothio-compounds are equivalent in these respects, and hence the degree of conversion of one into the other has no appreciable effect on either the solubility or the water-repellency powers of the mixture.

For use as water-repellents, the novel products of this invention have the advantage that they do not liberate acid in the baking step, or else probably liberate some unstable acids which decompose quickly and are evaporated. Consequently there is no appreciable tendering of the fiber, and the addition of buffers to the treatment bath is not needed.

I claim:

1. A compound of the group defined by the formulas

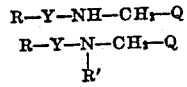

and

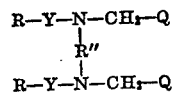

wherein R stands for an aliphatic radical containing at least 7 carbon atoms and being free of water-solubilizing groups; Y is a link selected from the group consisting of CO, O—CO, NH—CO, CO—NHCO and O—CO—NHCO; Q is a radical of the group consisting of the thiocyanate radical and the isothiocyanate radical, while R' and R'' are respectively lower alkyl and lower alkylene radicals.

2. A compound of the formula

wherein Alk stands for an alkyl radical having from 7 to 36 carbon atoms in its structure, while Q is a radical of the group consisting of the thiocyanate radical and the isothiocyanate radical.

3. A compound of the formula

wherein Alk stands for an alkyl radical having from 7 to 36 carbon atoms in its structure, while Q is a radical of the group consisting of the thiocyanate radical and the isothiocyanate radical.

4. A compound of the formula

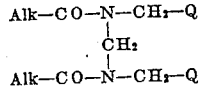

wherein Alk stands for an alkyl radical having from 7 to 36 carbon atoms in its structure, while Q is a radical of the group consisting of the thiocyanate radical and the isothiocyanate radical.

5. A compound selected from the group consisting of stearamido-methylene-thiocyanate and the corresponding isothiocyanate.

6. A compound selected from the group consisting of octadecyl-carbamido-methylene-thiocyanate and the corresponding isothiocyanate.

7. A compound selected from the group consisting of N,N'-methylene-bis-(stearamido-methylene-thiocyanate) and the corresponding bis-isothiocyanate.

8. The process of preparing novel organic compositions of matter, which comprises reacting with a salt of thiocyanic acid upon the N-methylene halide of an organic amide having an aliphatic chain of at least 7 carbon atoms, whereby to effect condensation between the two compounds with elimination of a metal halide.

9. The process of preparing novel organic compositions of matter, which comprises condensing a metal thiocyanate with a halogen compound as defined below, with elimination of the corresponding metal halide, said halogen compound being one selected from the group consisting of the methylene halides represented by the formulas

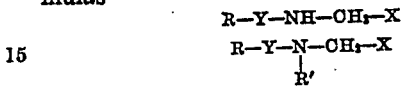

and

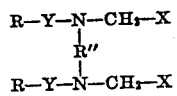

wherein R is an aliphatic radical containing at least 7 carbon atoms in its structure but being free from water-solubilizing groups, Y is a link selected from the group consisting of CO, O—CO, NH—CO, CO—NHCO, and O—CO—NHCO, X is halogen, while R' and R'' are respectively lower alkyl and lower alkylene radicals.

10. The process of preparing novel organic compositions of matter, which comprises reacting with a salt of thiocyanic acid upon a methylene chloride compound of the general formula

wherein Alk stands for an alkyl radical having from 7 to 36 carbon atoms in its structure, whereby to effect condensation between two compounds with elimination of a metal chloride.

11. The process of preparing novel organic compositions of matter, which comprises reacting with a salt of thiocyanic acid upon a methylene chloride compound of the general formula Alk—O—CONH—CH2Cl, wherein Alk stands for an alkyl radical having from 7 to 36 carbon atoms in its structure, whereby to effect condensation between said two compounds with elimination of a metal chloride.

12. The process of preparing novel organic compositions of matter, which comprises reacting with a salt of thiocyanic acid upon a methylene chloride compound of the general formula

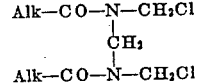

wherein Alk stands for an alkyl radical having from 7 to 36 carbon atoms in its structure, whereby to effect condensation between said two compounds with elimination of a metal chloride.

JOSEF PIKL.

CERTIFICATE OF CORRECTION.

Patent No. 2,331,276.  October 5, 1943.

JOSEF PIKL.

It is hereby certified that error appears in the printed specification of the above numbered patent requiring correction as follows: Page 1, second column, line 1, for "alkylamino" read --alkylimino--; page 5, second column, line 38, claim 10, before the word "two" insert --said--; and that the said Letters Patent should be read with this correction therein that the same may conform to the record of the case in the Patent Office.

Signed and sealed this 23rd day of November, A. D. 1943.

(Seal)

Henry Van Arsdale,
Acting Commissioner of Patents.